Figure 1:
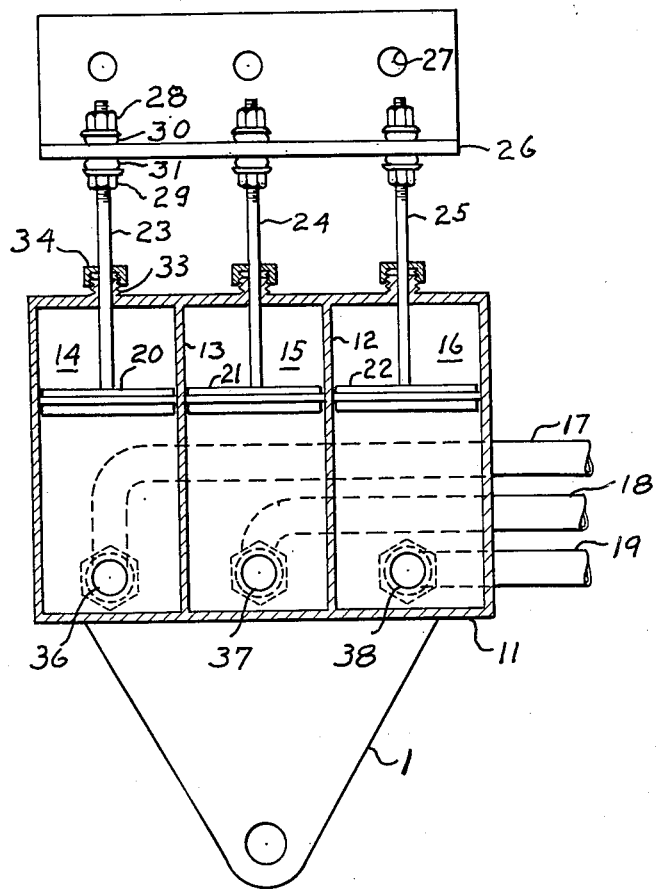

May 30, 1961 J. J. ZICCARDI 2,986,403
FLUID SUSPENSION SYSTEMS FOR AUTOMOBILES
Filed Dec. 3, 1958 2 Sheets-Sheet 1

INVENTOR.
John J. Ziccardi
BY William B. Jaspert
Attorney

United States Patent Office 2,986,403
Patented May 30, 1961

2,986,403
FLUID SUSPENSION SYSTEMS FOR AUTOMOBILES

John J. Ziccardi, R.D. 1, Marshall Road, Evans City, Pa., assignor of fifty percent to William B. Jaspert, Pittsburgh, Pa.

Filed Dec. 3, 1958, Ser. No. 777,907

3 Claims. (Cl. 280—104)

This invention relates to new and useful improvements in fluid suspension systems for automobiles to provide level riding, improve traction and eliminate sway, etc.

Suspension systems for automotive vehicles utilizing air or other liquid pressure equalizing means heretofore proposed employ a source of fluid under pressure such as a master cylinder from which the fluid flows to the shock absorbing system as for example individual fluid cylinders between the chassis and wheels at the points of suspension. In such systems, the particular fluid cylinder is subjected to forces imposed by road imperfections which compresses the fluid therein back to the master cylinder.

In accordance with the present invention, the vehicle is suspended by a plurality of fluid pressure cylinders at each point of suspension. The cylinders are interconnected in a manner to expose all of the suspension points to the same shock or compression forces simultaneously. The invention makes use of Pascal's law that pressure exerted on a fluid is transmitted equally in all directions and acts with the same force on all equal surfaces in a direction at right angles to them. By employing groups of fluid cylinders at each point of suspension, the number of cylinders at each group being one less than the number of suspension points and connecting one cylinder of each group to a cylinder of each of the other groups of cylinders, the forces acting on one point of suspension is equally applied to all points of suspension because the piston movement and volume displacement of the liquid is the same at all points.

Figure 2:
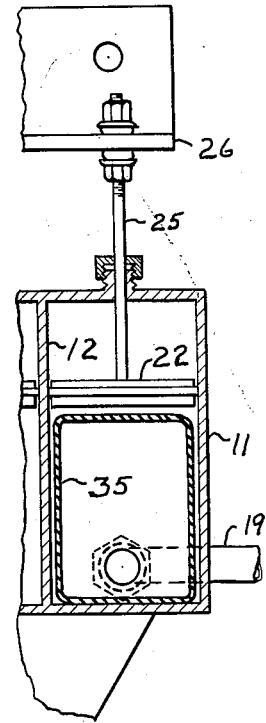
Figure 3:
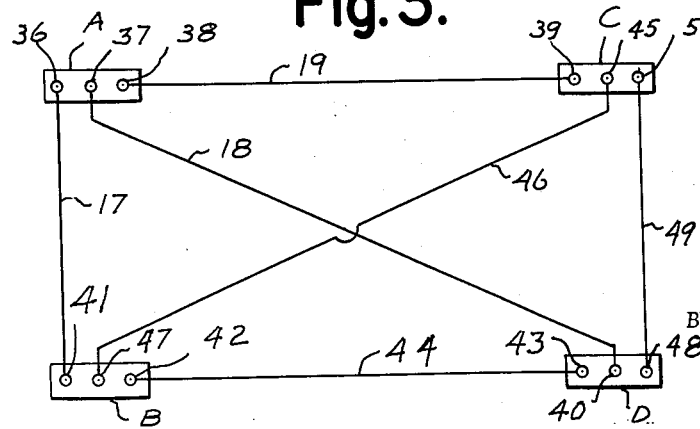
Figure 4:
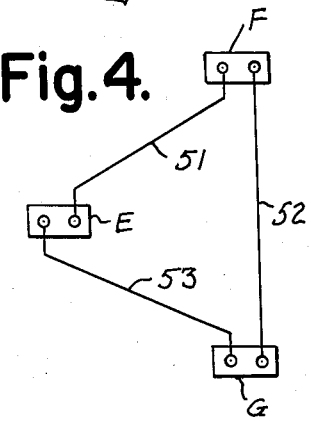
Figure 5:
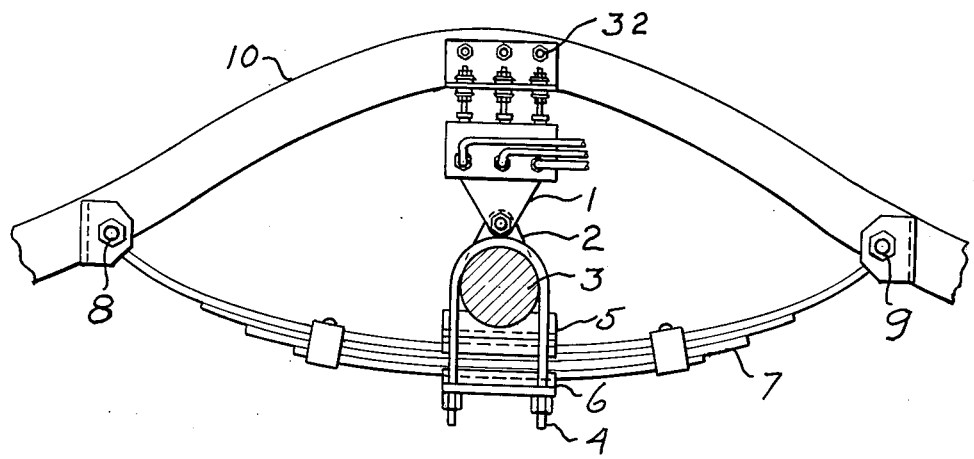
Figure 6:
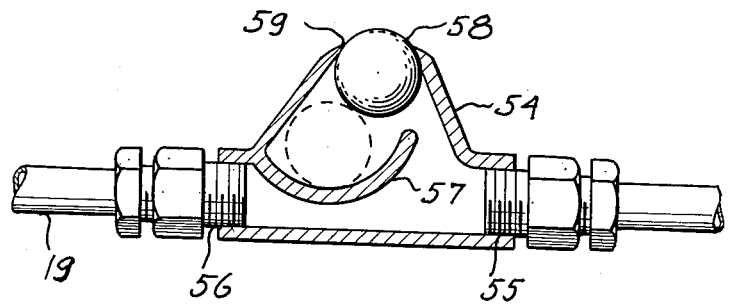

The invention will become more apparent from a consideration of the accompanying drawings constituting a part hereof in which like reference characters designate like parts and in which:

Figure 1 is a vertical section diagrammatically illustrating a fluid suspension unit embodying the principles of this invention;

Figure 2, a similar view showing one cylinder only of a modified form of fluid pressure device;

Figure 3, a top plan view diagrammatically illustrating a four-point suspension system embodying the units of Figure 1;

Figure 4, a diagrammatic illustration of a three-point suspension system;

Figure 5, a side elevation, partially in cross section, of one form of application of the suspension units of Figure 3; and Figure 6, a longitudinal section of a bleeder valve which may be employed in the fluid pressure lines of the system.

With reference to Figures 1 and 5 of the drawing, the numeral 1 designates a bracket which is supported on a bracket 2, Figure 5, strapped on the housing of a wheel axle 3. U-clamps 4 hold spring shackles 5 and 6 of a leaf spring 7 on the housing. While the invention is shown in connection with a spring suspended vehicle in Figure 5, it is evident that it may be used as the only means of suspension without a spring. The spring 7 is connected by shackle bolts 8 and 9 to the chassis frame 10 of an automotive vehicle.

As shown in detail in Figure 1, the bracket 1 may be an integral part of a cylinder housing 11 having partitions 12 and 13 that divide it into separate cylinder chambers 14, 15 and 16. These cylinders are connected by conduits 17, 18 and 19 to cylinders of other units as will be hereinafter explained. Disposed within the cylinder chambers are pistons 20, 21 and 22 having piston rods 23, 24 and 25, respectively, that are fastened to an angle bracket 26 having perforations 27 for fastening to the chassis frame 10, as shown in Figure 5. The piston rods are threaded and provided with nuts 28 and 29 with resilient washers 30 and 31 for securely fastening the rods to the angle bracket 26. The angle bracket is secured to the chassis frame 10 by bolts 32, Figure 5. Again referring to Figure 1, the cylinder chambers 14, 15 and 16 are provided with threaded bosses 33 having packing glands 34 for sealing the cylinder chambers while permitting freedom of movement of the piston rods therein.

In the operation of automobiles suspended by conventional spring units, cylinder chambers 14, 15 and 16 are partially filled, with a fluid which may be a liquid such as a light oil or air or other gaseous fluid as the case may be.

In the modification of the cylinder structure shown in Figure 2, the same cylinder housing 11 with the partitions 12 and 13 may be employed. Also, with the pistons 20, 21 and 22 and the piston rods, all as shown in Figure 1. However, instead of the cylinder chambers being filled with a liquid, they may be provided with a cell 35 of a collapsible material such as polyethylene plastic, which cells are filled with a fluid and are connected by conduits in the same manner as the cylinder chambers of Figure 1 are connected by conduits. By means of the fluid cells 35 of Figure 2, the cylinder and piston construction need not be leak-proof because the fluid is self-contained in the cells 35 independent of the piston cylinders.

The multiple cylinder piston units of Figure 1 are connected to the four suspension units of an automotive vehicle by attaching them to the axle housings in the manner shown in Figure 5. In Figure 3, the four points of suspension are designated A, B, C and D. The points of connection of conduits 17, 18 and 19 are designated with the numerals 36, 37 and 38, respectively. In Figure 3, conduit 19 of cylinder chamber 16 is connected to the outlet 39 of a cylinder chamber of the suspension unit C. Conduit 18 is connected to the outlet 40 of the suspension unit D; and conduit 17 is connected to the outlet 41 of the suspension unit B. Thus it is seen that one cylinder of the unit A is connected with a cylinder of each of the other units B, C and D, and in a similar manner, one cylinder of each of the units B, C and D is connected to each of the other units; thus, for example, unit B at outlet 42 is connected to outlet 43 of unit D by conduit 44. Unit C has a cylinder chamber outlet 45 connected by conduit 46 to the center cylinder chamber outlet 47 of the suspension unit B and unit D has one of its cylinder chamber outlets 48 connected by conduit 49 to a cylinder chamber outlet 50 of the suspension unit C. It will be noted that on a four-point suspension only three cylinders are required, whereas on a three-point suspension such as the wheels of an airplane, only two cylinders are needed for each suspension unit, thus the units E, F and G are interconnected by conduits 51, 52 and 53, each being connected to a cylinder of two units.

To prevent the forming of a vacuum in the conduits, a valve as shown in Figure 6, may be interposed. The valve consists of a housing 54 having threaded connection at 55 and 56 with the ends of conduits such as the conduit 19, for example. Within this housing is a perforated lip 57 that curves upwardly to form a nest for receiving a floatable ball valve 58, as shown in dotted lines. The valve housing 54 is provided with an opening 59 that is sealed by the ball valve 58 when the fluid in line 19 is under pressure. If, because of displacement of fluid from one cylinder to another, there would be a tendency to evacuate the line 19, for example, the ball valve 58 would drop in its nest and expose the conduit 19 to the atmosphere through the opening 59. This would balance the pressure inside and out of conduit 19 and when the pressure is restored, the valve 58 would immediately rise to seal the opening 59.

The operation of the above-described suspension system is briefly as follows:

When a wheel of the conventionally suspended automotive vehicle strikes a bump, the wheel rises and although some of the movement is absorbed by shock absorbers, the other three corners of the auto are affected causing a tipping movement of the body front and back and side-to-side. Also, when an automobile wheel drops in a depression, especially a driving wheel, traction may be lost due to the wheel bouncing off the rim of the depression despite the conventional shock absorbers.

In accordance with the present invention, assuming an automobile equipped with the fluid suspension units of Figure 1 in the manner described in connection with Figure 3, is moving along a roadway that is free of irregularities of surface, the body of the vehicle is parallel to the surface of the roadway and the springs of the automobile support the body and the fluid suspension units are inactive. When the vehicle encounters a hump in the roadway with, for example, the wheel on which the suspension unit A is mounted, the wheel rises and forces the springs 7 to move and similarly the pistons 20, 21 and 22 will move in their respective cylinders. The cylinders having the connection 38 is under pressure and the cylinder having connection 39 of the rear unit C will be under like pressure, and since the lower part or cylinder of the connected unit C is attached to the wheel axle housing, the pressure will set up a force between the wheel on the roadway and the body of the auto vehicle resulting in an upward movement of the body of the auto since the roadway is unyielding. In other words, the rear of the vehicle on the suspension unit C will be raised an equal amount as the front of the vehicle supported on unit A. Since, by the relative movement of the pistons and cylinders in the unit A and this unit being connected by conduits to the suspension units B, C and D, the latter will likewise raise the vehicle an equal amount to that of A. Therefore, all four corners of the vehicle are subjected to an upward force of equal intensity under Pascal's law. This is so because the pistons are rigidly connected and move simultaneously and the cylinders are likewise rigidly mounted so that they move simultaneously.

The system is equally effective to counteract moving of the vehicle on its rolling axis or in other words, side tipping as when rounding a curve because the body of the vehicle tending to tip would subject the two units on the side to which the tipping is directed to an equal force and since the cylinders 38 and 39, Figure 3 of the drawing, would be under pressure by an equal force, then the three components, cylinder 38, conduit 19 and cylinder 39 become as a rigid support since the liquid is not compressible. If there is a hump on the curve or turn that is encountered by any one of the wheels, no adverse effects would be created.

If the movement of the cylinders of the respective suspension points or units causes a partial vacuum in their connecting conduits, the valve 58 will open and admit air to prevent the collapse of the conduits and the valve will allow air to enter the conduits when a deficiency of liquids occurs. It will also allow air to escape when the liquid is under pressure, but it will not permit liquid to escape.

Although the invention has been illustrated as used with a leaf spring, it is evident that it can be applied to coil spring types of suspension and may be used without any kind of spring where it is desired to have the vehicle fluid suspended.

Although one embodiment of the invention has been herein illustrated and described, it will be evident to those skilled in the art that various modifications may be made in the details of construction without departing from the principles herein set forth.

I claim:

1. A suspension system for vehicles comprising a chassis supported on a plurality of wheel axles by a plurality of groups of fluid cylinders of equal volume and pistons, each group constituting a point of suspension with all of the cylinders connected to one side of the point of suspension and all of the pistons connected to the other side thereof and with one of the group of cylinders of each point of suspension connected to one of the group of cyilnders of another of the other points of suspension there being one less fluid cylinder and piston in each of said groups of each point of suspension than the number of points of suspension in the multiple point suspension system.

2. A suspension system for vehicles as set forth in claim 1 in which the cylinder connections are provided with valve openings to bleed air into said system.

3. A multiple point suspension system for vehicles as set forth in claim 1 in which the cylinders of each point of suspension are provided with a collapsible cell of equal volume which is acted upon by the pistons to be collapsible and expansible in response to movement of the vehicle chassis and wheel axles to displace or receive equal volumes of liquid at each point of suspension.

References Cited in the file of this patent

UNITED STATES PATENTS

| | | |
|---|---|---|
| 1,344,334 | Croonholm | June 22, 1920 |
| 1,847,252 | Miller | Mar. 1, 1932 |
| 1,865,865 | Lafleur | July 5, 1932 |
| 2,452,105 | Cosentino | Oct. 26, 1948 |

FOREIGN PATENTS

| | | |
|---|---|---|
| 1,030,729 | France | Mar. 18, 1953 |
| 1,055,080 | France | Oct. 14, 1953 |